United States Patent [19]
Ohno et al.

[11] Patent Number: 6,071,205
[45] Date of Patent: Jun. 6, 2000

[54] MULTI-STEPPED PULLEY, METHOD OF MANUFACTURING SAME, AND APPARATUS FOR MANUFACTURING SAME

[75] Inventors: Tetuo Ohno; Hiroshi Shohara; Yasuji Kasuya; Yasuo Tabuchi; Masahiro Kinoshita, all of Kariya, Japan

[73] Assignee: Denso Corporation, Kariya, Japan

[21] Appl. No.: 09/076,739

[22] Filed: May 13, 1998

[30] Foreign Application Priority Data

May 14, 1997 [JP] Japan ..................... 9-124488

[51] Int. Cl.⁷ ............................................. F16H 55/49
[52] U.S. Cl. ............................................ 474/168; 474/170
[58] Field of Search ............................. 474/166, 167, 474/168, 169, 170–174, 191–192, 178, 902; 74/574; D08/360

[56] References Cited

U.S. PATENT DOCUMENTS

| | | | |
|---|---|---|---|
| 2,186,290 | 1/1940 | Gordon et al. ................ | 474/168 X |
| 4,522,612 | 6/1985 | Frazer ............................. | 474/168 |
| 4,548,592 | 10/1985 | Ohhashi et al. ................ | 474/168 |
| 4,710,152 | 12/1987 | Ichikawa et al. ............... | 474/166 |
| 4,881,426 | 11/1989 | Serizawa et al. ............... | 74/574 |
| 5,651,181 | 7/1997 | Shohara . | |

FOREIGN PATENT DOCUMENTS

| | | |
|---|---|---|
| 196 16 833 | 10/1996 | Germany . |
| 61-132238 | 6/1986 | Japan . |
| 8-300082 | 11/1996 | Japan . |

*Primary Examiner*—David A. Bucci
*Assistant Examiner*—Marcus Charles
*Attorney, Agent, or Firm*—Pillsbury Madison & Sutro LLP

[57] ABSTRACT

A multi-stepped pulley, and a method and apparatus for manufacturing the same, wherein the mechanical strength is increased while keeping down an increase of mass and a rise of manufacturing costs by pressing against portions of a surface of a hollow metal material having a circular cross-section corresponding to a connection portion of a plurality of pulleys by pressing rollers and simultaneously crushing the material in an axial direction so as to integrally form first and second rims, first and second webs, and a connection portion thereof.

9 Claims, 10 Drawing Sheets

MULTI-STEPPED PULLEY, METHOD OF MANUFACTURING SAME, AND APPARATUS FOR MANUFACTURING SAME

BACKGROUND OF THE INVENTION

1. Field of the Invention

The present invention relates to a multi-stepped pulley around which a plurality of belts are wound, more particularly relates to one which is effective when used for a pulley for transferring a drive force of an engine mounted in a vehicle to a compressor of a vehicular refrigerating cycle, and to a method and apparatus for manufacturing the same.

2. Description of the Related Art

As the shape of the multi-stepped pulley of the related art used for driving the compressor of a vehicular refrigerating cycle, there is for example well known the one shown in FIG. 1.

Specifically, a plurality of rims over which so-called "poly-V-belts" are wound, that is, a first rim 111 and a second rim 121, are connected coaxially. A web 123 is provided on an end portion of one of the rims (right side end portion of the second rim 121 in FIG. 1). This multi-stepped pulley is held and fixed by welding the inward circumferential side of the web 123 to a rotating body such as a rotor 140.

In such a multi-stepped pulley, however, in addition to a second bending stress resulting from a tension acting upon the belt wound over the second rim 121, a first bending stress resulting from a tension acting upon the belt wound over the first rim 111 is generated at the web 123 and a connection portion between the web 123 and the second rim 121. For this reason, stress easily concentrates at the web 123 and the connection portion between the web and the second rim 121 in the multi-stepped pulley, so it is necessary to increase the mechanical strength of this portion.

However, there is a problem in that if simply making the thickness of the web 123 and the connection portion between the web 123 and the second rim 121 thicker in order to increase the mechanical strength, the mass of the multi-stepped pulley is increased and the manufacturing cost rises due to the increase of the material used.

Further, as a method of manufacturing of general multi-stepped pulley, as disclosed in Japanese Unexamined Patent Publication (Kokai) No. 61-132238, thre has been known a method of forming a plurality of rims by "slotting" a substantially disk-shaped metal material of the multi-stepped pulley.

In the method of forming a plurality of rims by "slotting", that is, cutting open the material by a roller blade, however, there is large abrasion of the front end of the slotting roller for slotting the multi-stepped pulley material, so there is a problem of a short service life of the slotting roller.

SUMMARY OF THE INVENTION

An object of the present invention, in consideration with the problem of the related art, is to achieve an improvement of the mechanical strength of a multi-stepped pulley while keeping down an increase of mass of the multi-stepped pulley and a rise of the manufacturing costs.

To achieve the above object, according to a first aspect of the present invention, as disclosed in claim 1 and shown in FIG. 2, there is provided a multi-stepped pulley provided with a first web (113) connected to a portion of a side surface of a first rim (111) facing a second rim (121) side, a second web (123) connected to a portion of a side surface of the second rim (121) facing the first rim (111) side, and a cylindrical connection portion (130) for connecting end portions of inward circumferential sides of the two webs (113 and 123). The two rims (111 and 121), the two webs (113 and 123), and the connection portion (130) are integrally formed by plastic deformation of a cylindrical metal material (10) having a circular cross-section.

By this, a first bending moment resulting from the tension acting upon the belt wound over the first rim (111) will be received by the connection portion (130) via the first web (113). Similarly, the second bending moment resulting from the tension acting upon the belt wound over the second rim (121) will be received by the connection portion (130) via the second web (123).

For this reason, the first bending moment does not directly act upon the second web (123) and the connection portion between the second rim (121) and the second web (123), therefore the first bending stress resulting from the first bending moment in the second web (123) and the connection portion between the second rim (121) and the second web (123) can be reduced. Similarly, the second bending stress resulting from the second bending moment in the first web (113) and the connection portion between the first rim (111) and the first web (113) can be reduced.

Accordingly, it is not necessary to increase the thickness of the webs (113 and 123) and connnection portions between the webs (113 and 123) and rims (111 and 121), so an increase of the mechanical strength of the multi-stepped pulley can be achieved while keeping down the increase of mass of the multi-stepped pulley and the rise of the manufacturing costs.

According to a second aspect of the present invention, disclosed in claims 2 to 4, there is provided a method of manufacturing a multi-stepped pulley comprising pressing against a portion of a cylindrical metal material (10) corresponding to the connection portion (130) by pressing rollers (13 and 14) to crush the cylindrical metal material (10) in an axial direction and thereby form two rims (111 and 121), two webs (113 and 123), and the connection portion (130).

In the second aspect of the present invention, by not performing the slotting as in the related art, but by pressing down the pressing rollers (13 and 14) to crush the cylindrical metal material (10) in the axial direction, not only are a plurality of rims simultaneously formed, but also the two webs (123 and 123) and the connection portion (130) are formed, therefore no slotting roller is required. Accordingly, not only does the problem of abrasion of the front end of the slotting roller not occur, but also it is possible to extend the service life of the roller used for shaping the multi-stepped pulley.

Further, since slotting is achieved by cutting open the material of the multi-stepped pulley by the blade of the slotting roller and causing slip (flow) of the crystals and plastic deformation, the amount of slip (degree of machining) inevitably becomes large. For this reason, there is a large rise of hardness at the rims due to the machining and there arises a problem in that the service life of the groove-shaping rollers for forming grooves in the rims becomes short.

In the present invention, on the other hand, in the cylindrical metal material (10) used as the material of the multi-stepped pulley, the crystals slip (undergo plastic deformation) mainly at the connection portions between the rims (111 and 121) and the webs (113 and 123) and the connection portions between the webs (113 and 123) and the connection portion (130).

Accordingly, since, according to the second aspect of the present invention, the amount of the slip (degree of machining) of the crystals at the rims (111 and 121) is small, the degree of hardening by machining at the rims (111 and 121) becomes small and extension of the service life of the groove-shaping rollers can be achieved.

The grooves (112, 122) of the two rims (111 and 121) are shaped by causing slip (plastic deformation) of the crystals of the materials comprising the two rims (111 and 121) by the groove-shaping rollers, therefore parts of the two rims (111 and 121) try to slip (flow) so as to reduce a gap (131) between the two webs (113, 123).

For this reason, along with the slip (flow) of the material, a stress (shear stress) in the slip (flow) direction acts upon the front end of the groove-shaping rollers, therefore there is a danger of causing reduction of the service life of the groove-shaping rollers.

Therefore, in the preferred embodiment of the second aspect of the invention disclosed in claim 3, after the pulley shaping process is ended, grooves (112 and 122) are formed at the rims (111 and 121) by groove-shaping rollers (16) in a state with the side surfaces of a holding roller (15) brought into contact with the two webs (113 and 123).

Since it is possible to restrict the slip (flow) of parts of the two rims (111 and 121) reducing the gap (131) by the holding roller (15) by this, the stress (shear stress) in the slip (flow) direction can be prevented from acting upon the front ends of the groove-shaping rollers (16). Accordingly, extension of the service life of the groove-shaping rollers can be achieved.

In the preferred embodiment of the second aspect of the invention disclosed in claim 4, the holding roller (15) is first brought into contact with the two webs (113 and 123), then the grooves (112 and 122) are shaped by the groove-shaping rollers (16).

This enables the reliable restriction of the slip (flow) of parts of the two rims (111, 121) reducing the gap (131), so further extension of the service life of the groove-shaping rollers can be achieved.

According to a third aspect of the present invention disclosed in claim 5, there is provided an apparatus for manufacturing a multi-stepped pulley disclosed in claim 1, comprising first and second mandrels (11, 12) for pressing against the cylindrical metal material (10) from the two axial direction end sides of the material (10) to chuck the material (10); displacement limiting portions (11a and 12a) which are formed at portions of the two mandrels (11 and 12) corresponding to the two axial direction ends of the material (10), that is, the material ends (10a), and limit the displacement of the material ends (10a) with respect to the two mandrels (11 and 12); and pressing rollers (13 and 14) for pressing against portions of the outer walls of the material (10) corresponding to the connection portion (130) toward the inward circumferential side of the material (10). The material (10) is rotated in a state with the material (10) chucked by the first and second mandrels (11 and 12). The material (10) is crushed in the axial direction of the material (10) by the two mandrels (11 and 12) while the material (10) is pressed against by the pressing rollers (13 and 14) to thereby form the two rims (111 and 121), the two webs (113 and 123), and the connection portion (130).

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Figure 1:
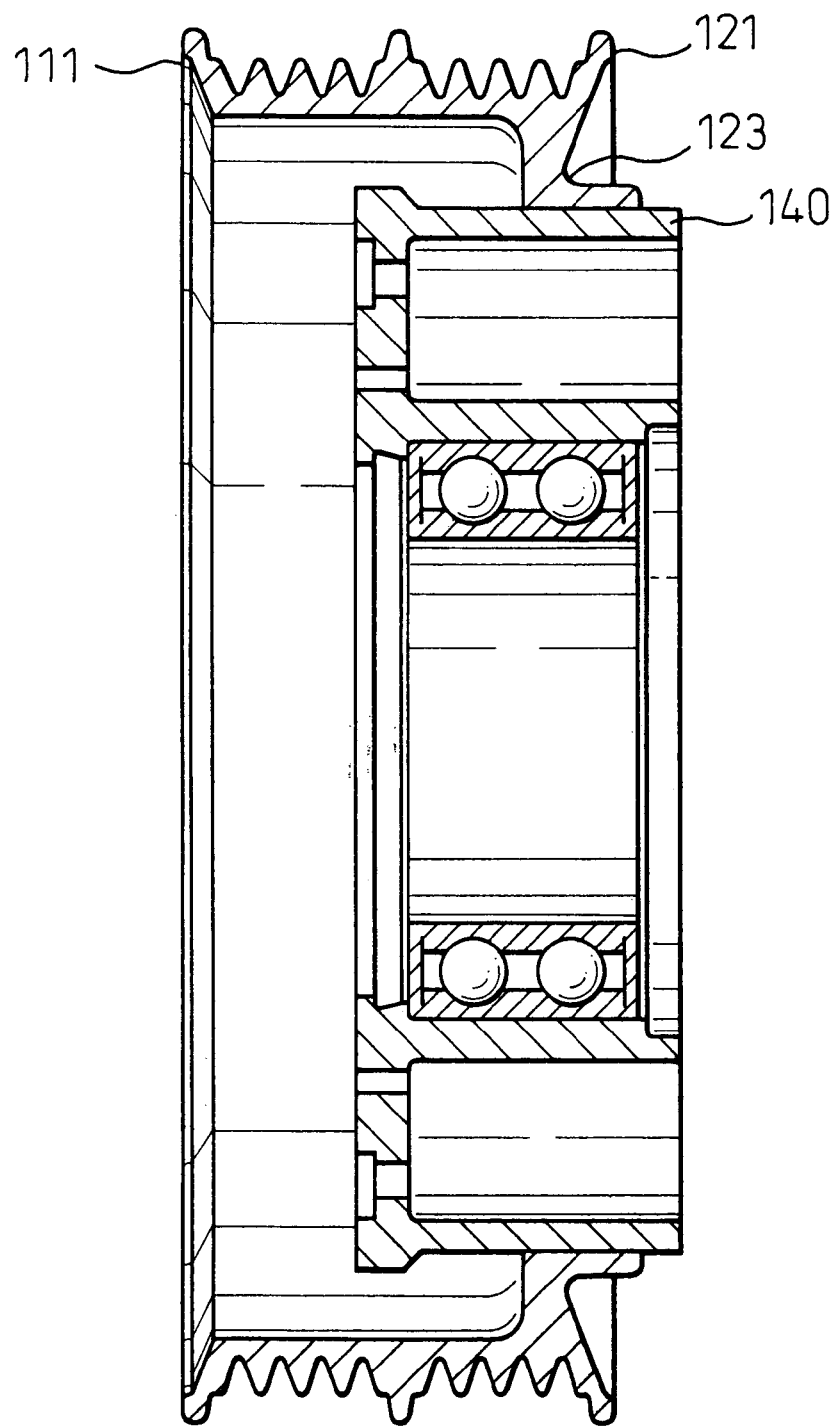
FIG. 1 is a sectional view of a multi-stepped pulley of the related art.
Figure 2:
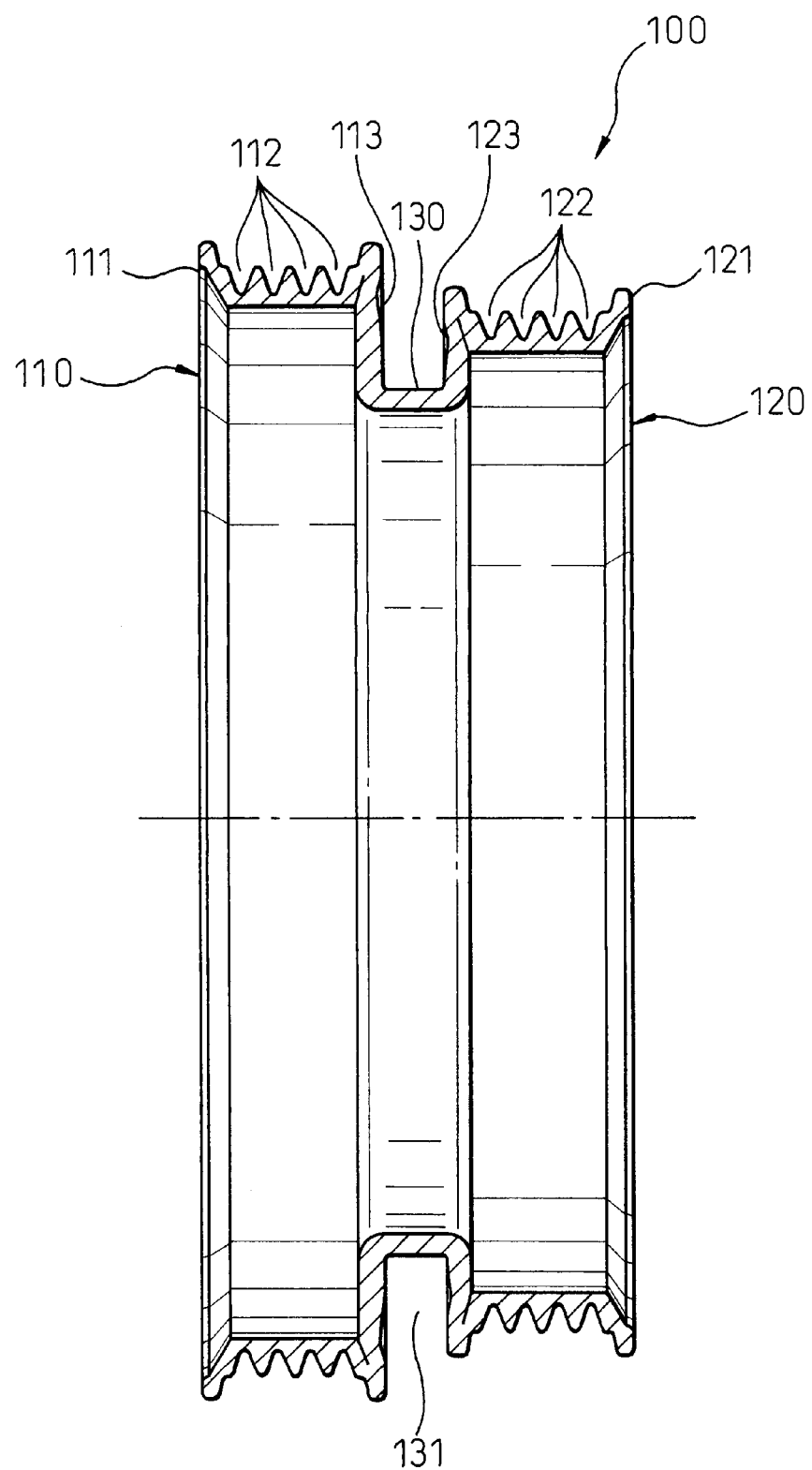
FIG. 2 is a sectional view of a multi-stepped pulley of the present invention.

In the illustrated embodiment, the present invention is applied to a multi-stepped pulley used for transferring the drive force of an engine mounted in a vehicle to a compressor of a vehicular refrigerating cycle. FIG. 2 shows a cross-section of the multi-stepped (two-stepped) pulley 100 according to the present embodiment.

In FIG. 2, 111 is a first rim having first grooves 112 upon which a first belt (not illustrated) is wound, and 121 is a second rim having second grooves 122 upon which a second belt (not illustrated) is wound. The two rims 111 and 121 are formed next to each other coaxially with a predetermined gap therebetween. A first pulley 110 is constituted by the first rim 111 and the first groove 112, and a second pulley 120 is constituted by the second rim 121 and the second groove 122.

A ring-shaped first web 113 extending projecting toward the inward circumferential side of the first rim 111 is connected to a portion of a side surface of the first rim 111 facing the second rim 121 side. On the other hand, an approximately ring-shaped second web 123 extending projecting toward the inward circumferential side of the second rim 121 is connected to a portion of a side surface of the second rim 121 facing the first rim 111 side.

Figure 4:
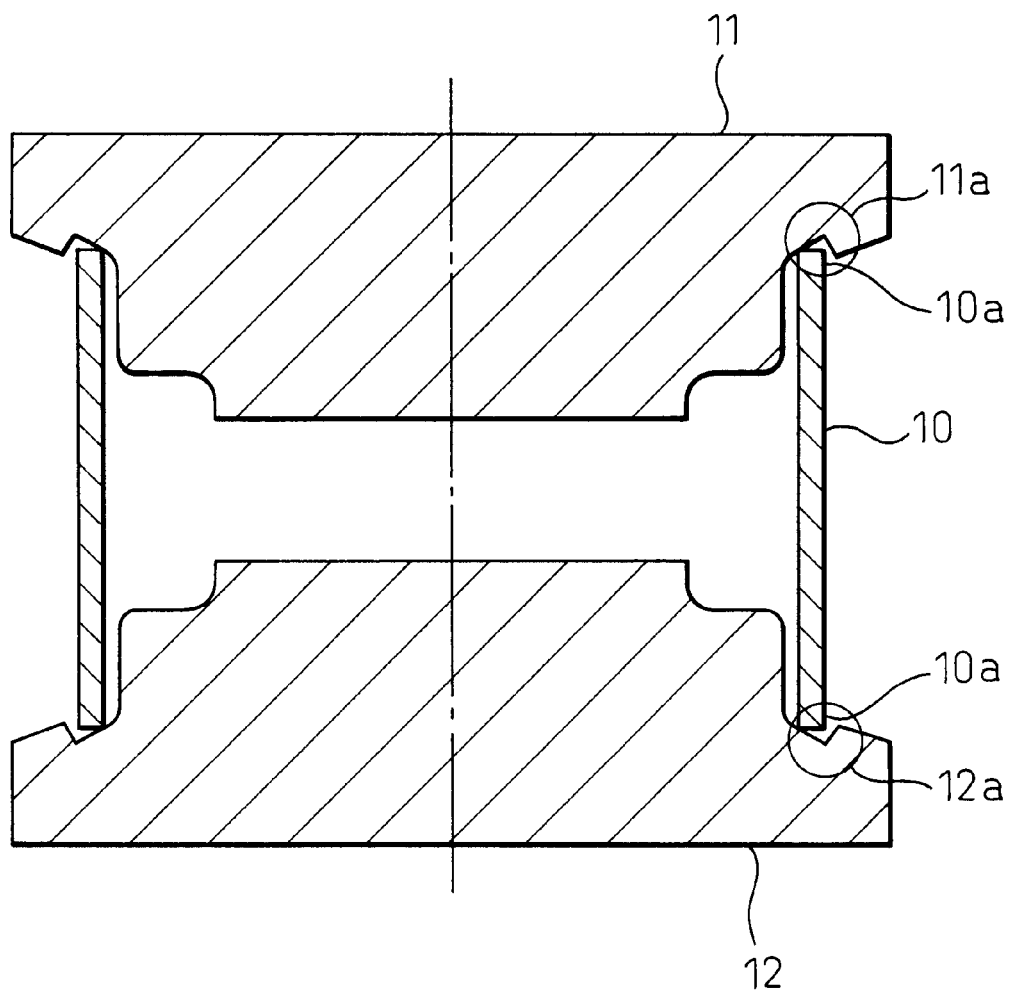
FIG. 4 is a schematic view of a chucking step.

The inward circumferential side end portions of the two webs 113 and 123 are connected to the approximately cylindrical connection portion 130 for holding the two webs 113 and 123. These connection portion 130, two rims 111 and 121, and two webs 113 and 123 are integrally formed by plastic deformation of the pipe material 10 (refer to FIG. 4) comprised of cold rolled steel sheet (made of SPCC in the present embodiment) serving as the cylindrical metal material having a circular cross-section.

Figure 3:
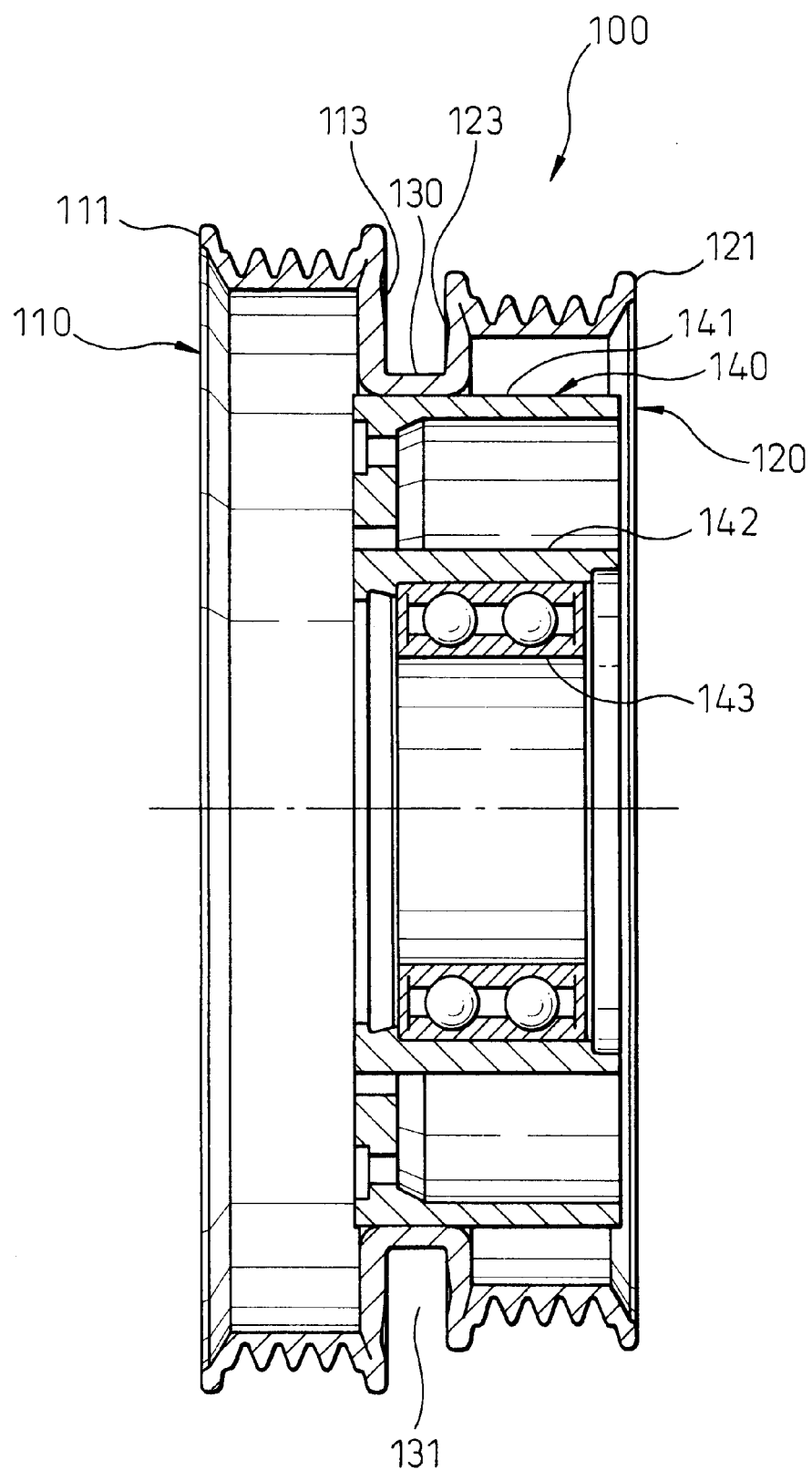
FIG. 3 is a sectional view of a state where the multi-stepped pulley is attached to a rotor.

Note that FIG. 3 shows a state where the multi-stepped pulley 100 according to the present embodiment is attached to a rotor (generally a rotating body) 140 of an electromagnetic clutch (not illustrated). An outer cylinder 141 of this double cylindrical rotor 140 is affixed to the connection portion 130 by welding. A bearing 143 is press-fit into an inner cylinder 142.

Next, the method of manufacturing of the multi-stepped pulley 100 according to the present embodiment will be explained step by step.

First, the pipe material 10 is pressed by the first and second mandrels 11 and 12 from the two axial direction end sides of the pipe material 10 to chuck it (chucking step).

Note that engagement portions (displacement limiting portions) 11a and 12a for limiting the displacement of the two axial direction ends 10a of the pipe material 10 (hereinafter referred to as the pipe ends) with respect to the first and second mandrels 11 and 12 are formed at portions of the first and second mandrels 11 and 12 corresponding to the two pipe ends 10a.

Figure 5:
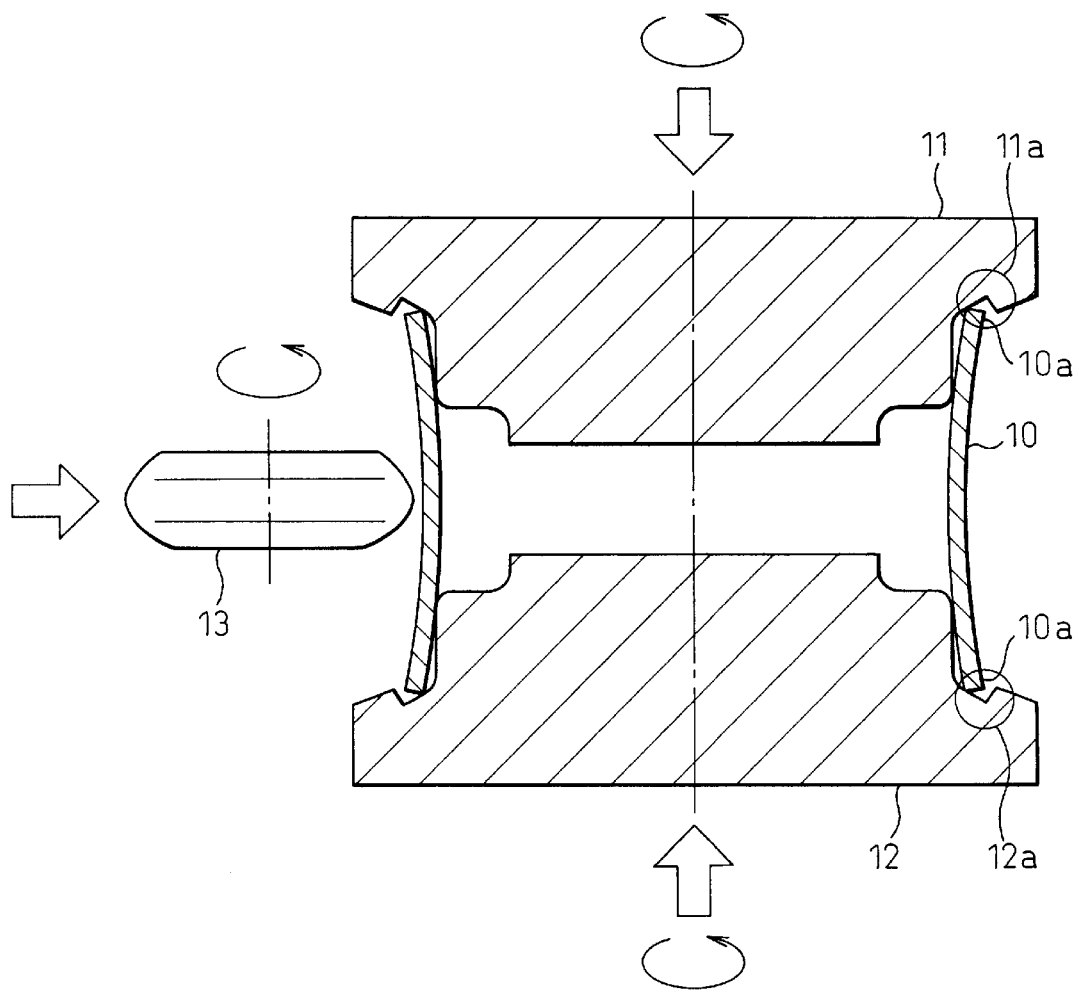
FIG. 5 is a schematic view of a first pulley-shaping step.

Next, in a state with the pipe material 10 chucked, the first and second mandrels 11 and 12 are rotated to rotate the pipe material 10. At the same time, the portions of the outer walls of the pipe material 10 corresponding to the connection portion 130 are pressed from the outer wall side to the inward circumferential side of the pipe material 10 by the first pressing roller 13 and the pipe material 10 is crushed in the axial direction of the pipe material 10 by the first and second mandrels 11 and 12 to cause plastic deformation as shown in FIG. 5 (first pulley-shaping step).

Figure 6:
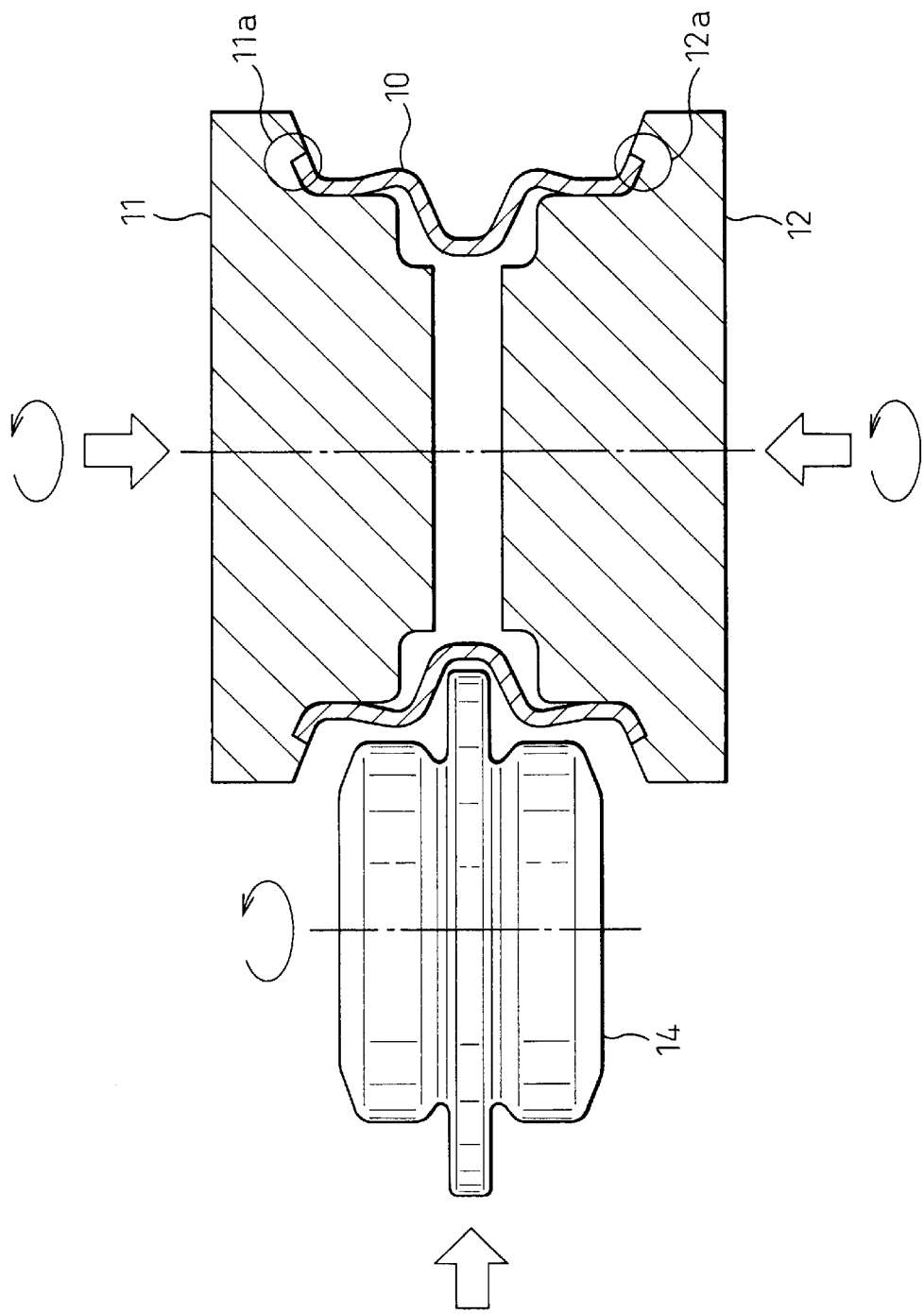
FIG. 6 is a schematic view of an initial stage of a second pulley-shaping step.
Figure 7:
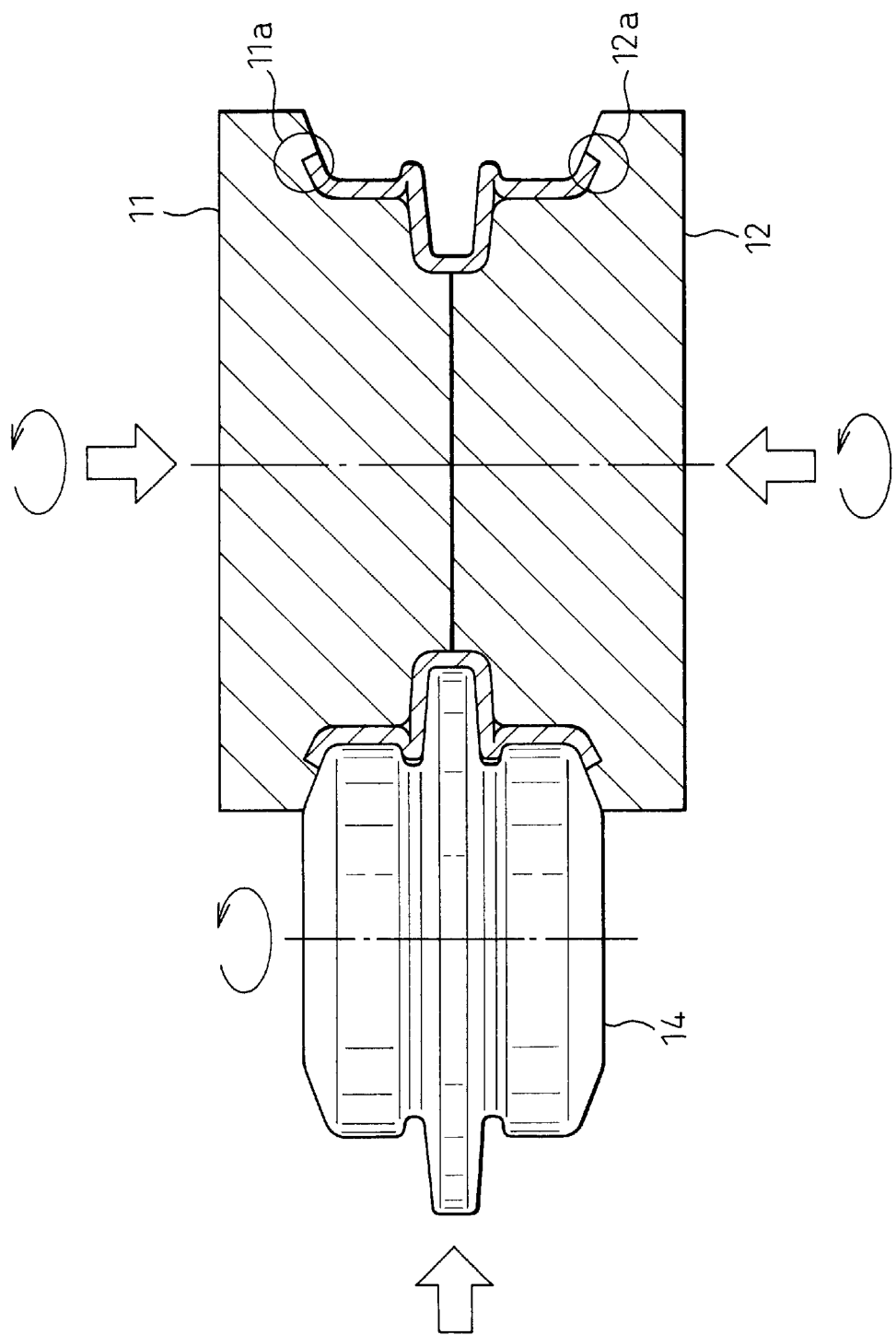
FIG. 7 is a schematic view of a final stage of the second pulley-shaping step.

Then, when the plastic deformation of the pipe material 10 advances to a predetermined state, as shown in FIG. 6 and FIG. 7, the outer wall side of the pipe material 10 is pressed by the second pressing roller 14 in place of the first pressing roller 13 to form the two rims 111 and 121, two webs 113 and 123, and connection portion 130 (second pulley-shaping step).

Figure 8:
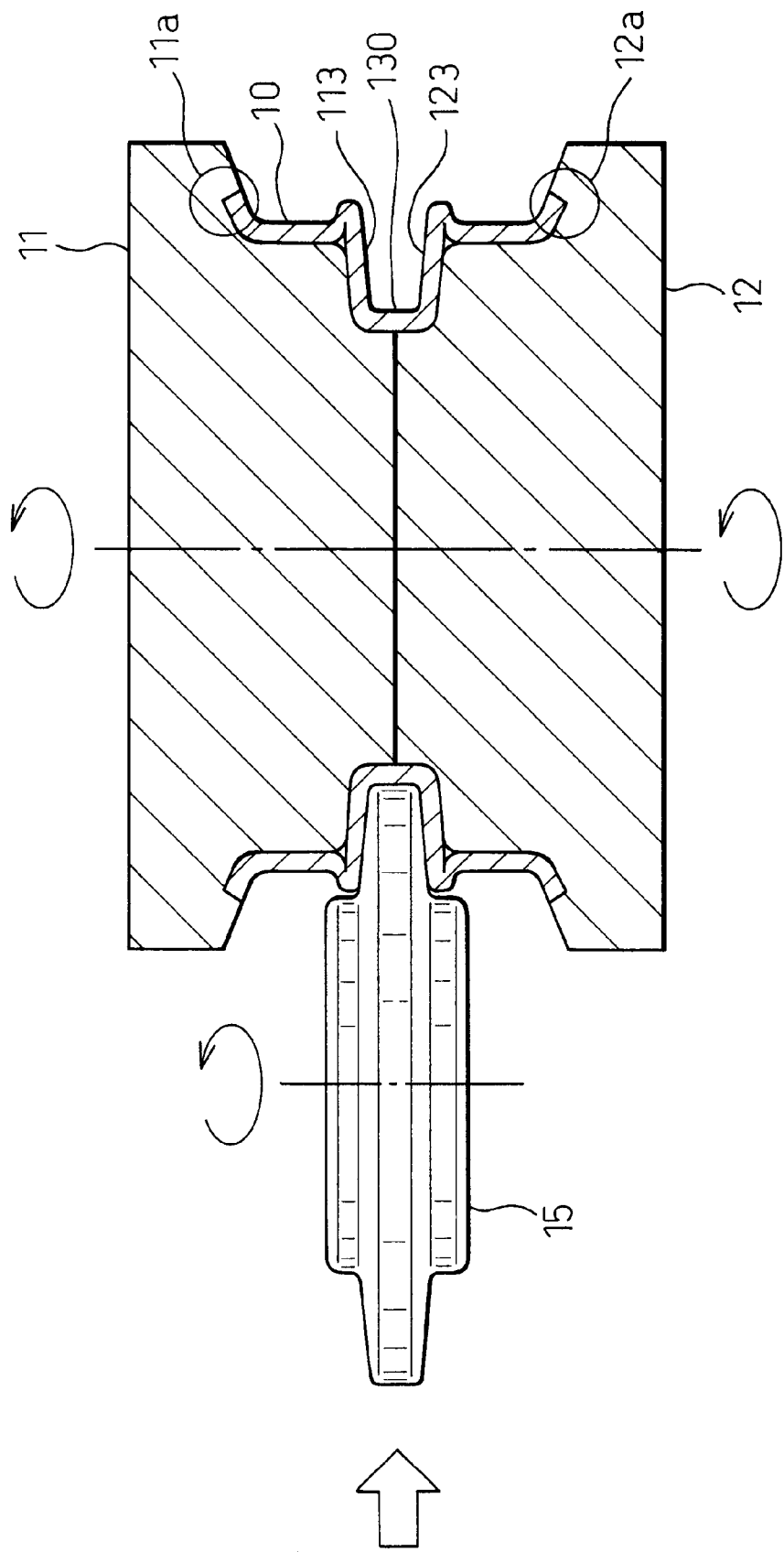
FIG. 8 is a schematic view of a holding roller contacting step.

Then, further, when the plastic deformation of the pipe material 10 advances and the second pulley-shaping step is completed, as shown in FIG. 8, the holding roller 15 is inserted into the groove portion 131 (refer to FIGS. 2 and 3) formed by the webs 113 and 123 and the connection portion 130 in place of the second pressing roller 14, and the side surfaces of the holding roller 15 are brought into contact with the two webs 113 and 123 (holding roller contacting step).

Figure 9:
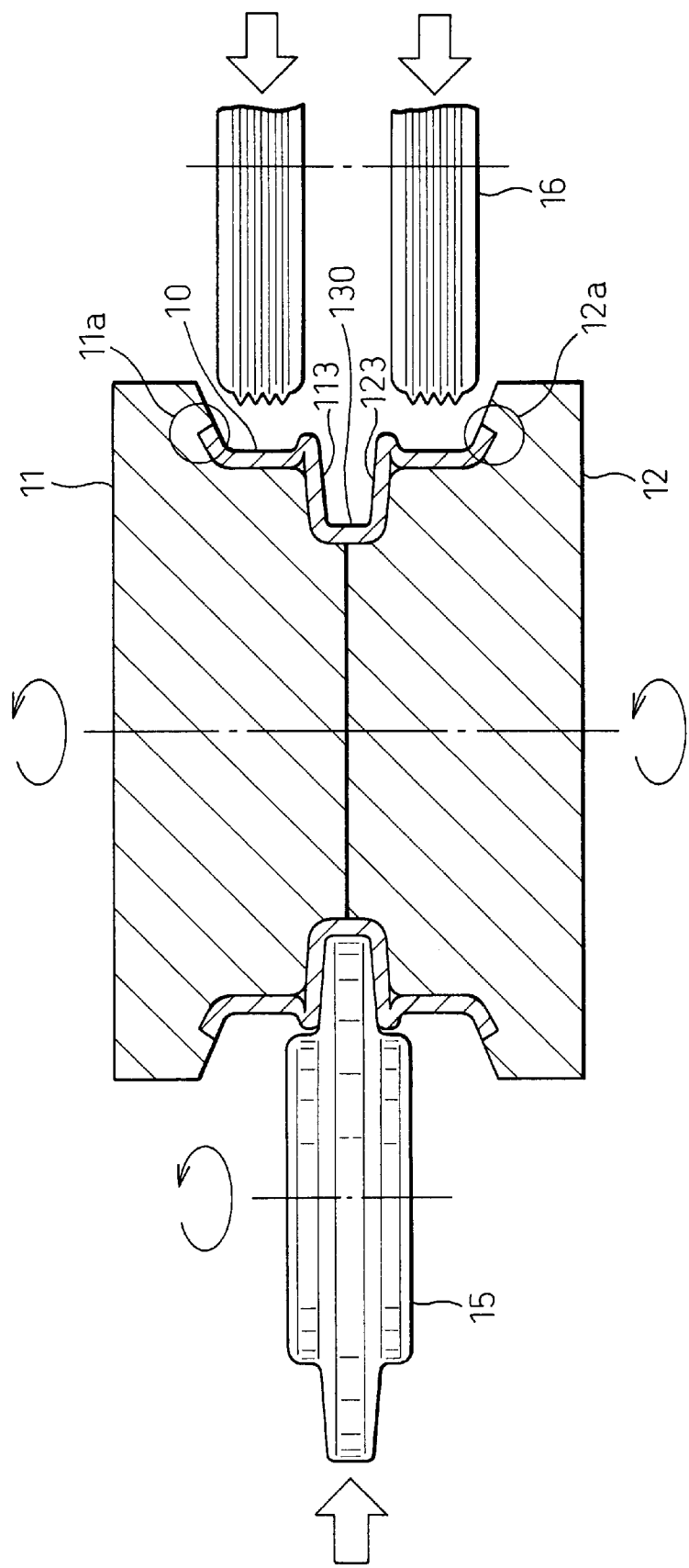
FIG. 9 is a schematic view of a groove-shaping step.

Next, in a state with the side surfaces of the holding roller 15 brought into contact with the two webs 113 and 123, as shown in FIG. 9, the groove-shaping rollers 16 are pressed against the rims 111 and 121 from the opposite side from the holding roller 15 to form the grooves 112 and 122 (groove-shaping step).

Next, the characteristic feature of the present embodiment will be explaioned.

In the multi-stepped pulley 100 according to the present embodiment, the first and second rims 111 and 121, the first and second webs 113 and 123, and the connection portion 130 are integrally formed by plastic deformation of the cylindrical pipe material 10, therefore the first bending moment resulting from the tension acting upon the belt wound around the first rim 111 will be received by the connection portion (130) via the first web 113. Similarly, the second bending moment resulting from the tension acting upon the belt wound around the second rim 121 will be received by the connection portion 130 via the second web 123.

For this reason, the first bending moment does not directly act upon the second web 123 and the connection portion between the second rim 121 and the second web 123, therefore the first bending stress resulting from the first bending moment in the second web 123 and the connection portion between the second rim 121 and the second web 123 can be reduced. Similarly, the second bending stress resulting from the second bending moment in the first web 113 and the connection portion between the first rim 111 and the first web 113 can be reduced.

Accordingly, it is not necessary to increase the thickness of the webs 113 and 123 and the connection portions between the webs 113 and 123 and the rims 111 and 121, therefore an increase of the mechanical strength of the multi-stepped pulley can be achieved while keeping down the increase of the mass of the multi-stepped pulley and the rise of the manufacturing costs.

Further, as in the illustrated embodiment, in the state of use of the multi-stepped pulley 100, when the connection portion 130 is welded and fixed to the rotor 140, the connection portion 130 can cut off the transfer of the first bending moment to the second web 123 and the connection portion between the second rim 121 and the second web 123, therefore the stress resulting from the first bending moment at these positions can be substantially completely prevented. Similarly, the generation of stress resulting from the second bending moment at the first web 113 and the connection portion between the first rim 111 and the first web 113 can be substantially completely prevented.

Further, in the present embodiment, since the pipe material 10 is crushed in the axial direction while pressing against the portions of the pipe material 10 corresponding to the connection portion 130 by the pressing rollers 13 and 14 to shape the first and second rims 111 and 121, the first and second webs 113 and 123, and the connection portion 130, extension of the service life of the rollers used for the shaping of the multi-stepped pulley can be achieved in comparison with the method of shaping the multi-stepped pulley by slotting as in the related art.

Further, in slotting, as mentioned above, it is necessary to remove part of the multi-stepped pulley material by punching out the center portion of the approximately disk-shaped multi-stepped pulley material or the like, but in contrast, in the present embodiment, the multi-stepped pulley is shaped by plastic deformation of the pipe material 10 with two initially opened ends, therefore it is not necessary to remove part of the pipe material 10. Accordingly, when shaping the multi-stepped pulley, wasted removed material is not generated, so a reduction of the manufacturing costs of the multi-stepped pulley can be achieved.

Further, in the present embodiment, after the first pulley-shaping step is ended, in a state with the side surfaces of the holding roller 15 brought into contact with the first and second webs 113 and 123, the grooves 112 and 122 are formed in the rims 111 and 121 by the groove-shaping rollers 16, therefore the slip (flow) of part of the first and second rims 111 and 121 reducing the gap 131 can be prevented by the holding roller 15.

Accordingly, the stress (shear stress) in the slip (flow) direction does not act upon the front end of the groove-shaping rollers 16, therefore extension of the service life of the groove-shaping roller 16 can be achieved.

Further, since plastic deformation reducing the gap 131 in the groove-shaping step can be prevented, the finished dimensional precision of the gap 131 (multi-stepped pulley) can be improved.

For this reason, when welding for example the connection portion 130 to the rotor 140, the welding use nozzle can be reliably inserted into the gap 131, therefore it is possible to prevent the reduction of efficiency of the welding work in advance.

Further, since the grooves 112 and 122 are formed by the groove-shaping rollers 16 after the holding roller 15 is brought into contact with the first and second webs 113 and 123, the slip (flow) of parts of the first and second rims 111 and 121 reducing the gap 131 can be reliably prevented, therefore further prolongation of service life of the groove shaping roller 16 can be achieved.

Note that, in the above embodiment, the second pulley-shaping step was carried out by the second pressing roller 14 after the first pulley-shaping step by the first pressing roller 143, but the first pulley-shaping step can be eliminated and the second pulley-shaping step carried out after the chucking step.

Figure 10:
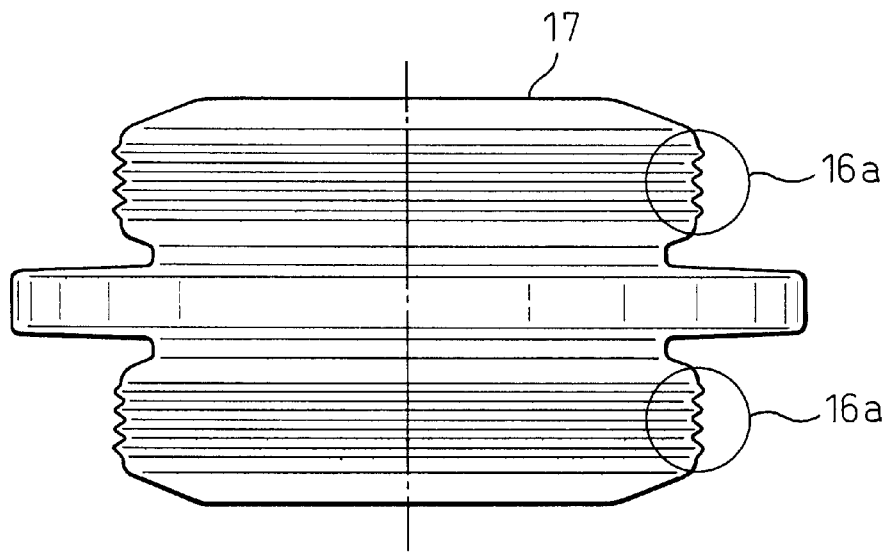
FIG. 10 is a schematic view of a modification of a second pressing roller.

Further, as shown in FIG. 10, it is also possible to use a second pressing roller 17 having a groove-shaping portions 16*a* for provisionally forming the grooves 112 and 122 at portions corresponding to the first and second rims 111 and 121 in place of the second pressing roller 14.

Further, in the above embodiment, the groove-shaping step using the groove-shaping roller 16 was carried out after the holding roller contacting step using the holding roller 15, but the two steps can be simultaneously carried out too.

Figure 11:
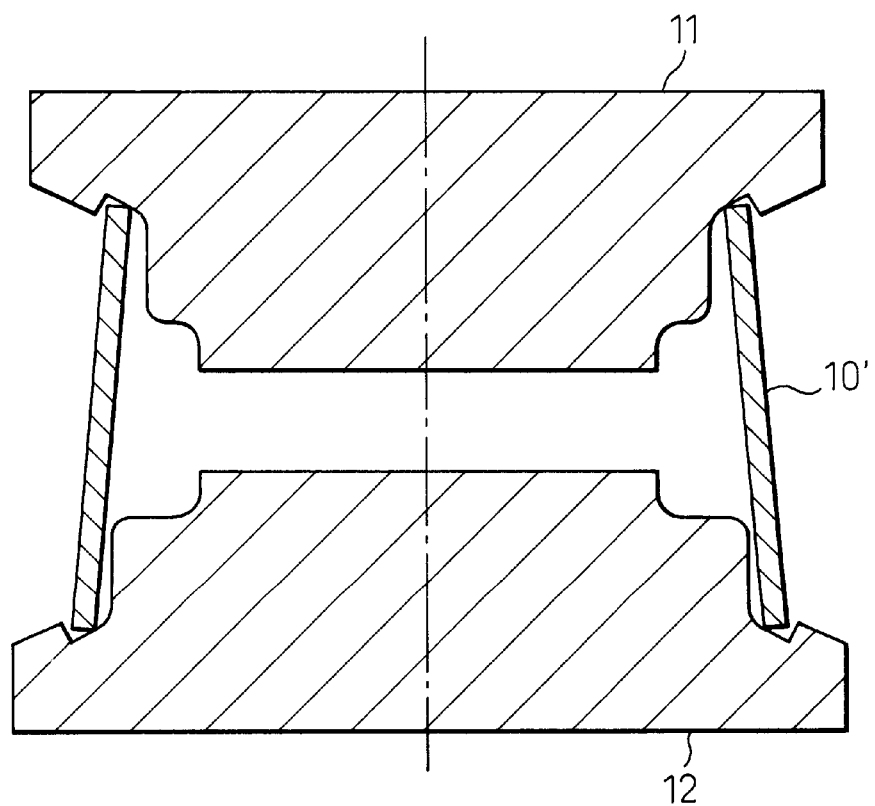
FIG. 11 is a schematic view of a modification of a cylindrical metal material.

Further, where the diameters of the first pulley 110 and the second pulley 120 are different as in the multi-stepped pulley 100 according to the embodiment, as shown in FIG. 11, it is also possible to shape the multi-stepped pulley 100 from a frustoconical pipe material 10'.

Further, in the illustrated embodiments, the pipe material 10 or 10' was used as the cylindrical metal material having a circular cross-section, but also a cheap cup-shaped material with a bottom can be used in place of this. In this case, before shaping, the bottom surface is removed in advance, or a large opening is formed in the bottom surface. In certain cases, it is also possible to shape this while leaving the bottom and use the bottom as a reinforcing material or remove the bottom after shaping. Where the shaping is carried out in a state with the bottom remaining, even in part, the mandrel 11 or 12 is shaped so as to be adapted to this.

What is claimed is:

1. A multi-stepped pulley around which a plurality of belts are wound, comprising:

a first rim having having first grooves around which a first belts is wound, a second rim having second grooves around which a second belt is wound and which is formed next to said first rim coaxially with a predetermined gap therebetween, a ring-shaped first web which is connected to a portion of a side surface of said first rim facing said second rim and extends projecting inwardly from the portion of the side surface of said first rim, a ring-shaped second web which is connected to a portion of a side surface of said second rim facing said first rim and extends projecting inwardly from the portion of the side surface of said second rim, and a cylindrical connection portion for connecting inward end portions of said first and second webs;

wherein said first rim, said first web, said connection portion, said second web and said second rim are integrally formed along an axial direction of a cylindrical metal material by plastic deformation of said cylindrical metal material.

2. A multi-stepped pulley according to claim 1, wherein a rotor is inserted into said cylindrical connection portion and fixed thereto.

3. A multi-stepped pulley according to claim 1, wherein said cylindrical connection portion has a diameter smaller than diameters of said first and second rims resulting from an inward deformation of a middle portion of said cylindrical metal material.

4. A multi-stepped pulley around which a plurality of belts are wound, comprising:

a generally cylindrical metal member plastically deformed to integrally include:

a first rim having having first grooves around which a first belt is wound, a second rim having second grooves around which a second belt is wound and which is formed next to said first rim coaxially with a predetermined gap therebetween, a ring-shaped first web which is connected to a portion of a side surface of said first rim facing said second rim and extends projecting inwardly from the portion of the side surface of said first rim, a ring-shaped second web which is connected to a portion of a side surface of said second rim facing said first rim and extends projecting inwardly from the portion of the side surface of said second rim, and a cylindrical connection portion for connecting inward end portions of said first and second webs;

wherein said first rim, said first web, said connection portion, said second web and said second rim are formed along an axial direction of the metal member.

5. A multi-stepped pulley according to claim 4, and further including a rotor inserted into said cylindrical connection portion and fixed thereto.

6. A multi-stepped pulley according to claim 4, wherein said cylindrical connection portion has a diameter smaller than a diameter of said first rim, a diameter of said second rim and an initial diameter of a middle portion of said cylindrical member.

7. A multi-stepped pulley around which a plurality of belts are wound, comprising:

a generally frustoconically-shaped metal member plastically deformed to integrally include:

a first rim having having first grooves around which a first belt is wound, a second rim having second grooves around which a second belt is wound and which is formed next to said first rim coaxially with a predetermined gap therebetween, a ring-shaped first web which is connected to a portion of a side surface of said first rim facing said second rim and extends projecting inwardly from the portion of the side surface of said first rim, a ring-shaped second web which is connected to a portion of a side surface of said second rim facing said first rim and extends projecting inwardly from the portion of the side surface of said second rim, and a cylindrical connection portion for connecting inward end portions of said first and second webs;

wherein said first rim, said first web, said connection portion, said second web and said second rim are formed along an axial direction of the metal member.

8. A multi-stepped pulley according to claim 7, and further including a rotor is inserted into said cylindrical connection portion and fixed thereto.

9. A multi-stepped pulley according to claim 7, wherein said cylindrical connection portion has a diameter smaller than a diameter of said first rim, a diameter of said second rim and an initial diameter of a middle portion of said metal member.

* * * * *